Dec. 21, 1954    H. A. McANINCH ET AL    2,697,355
POWER TAKE-OFF ASSEMBLY
Filed Dec. 12, 1951
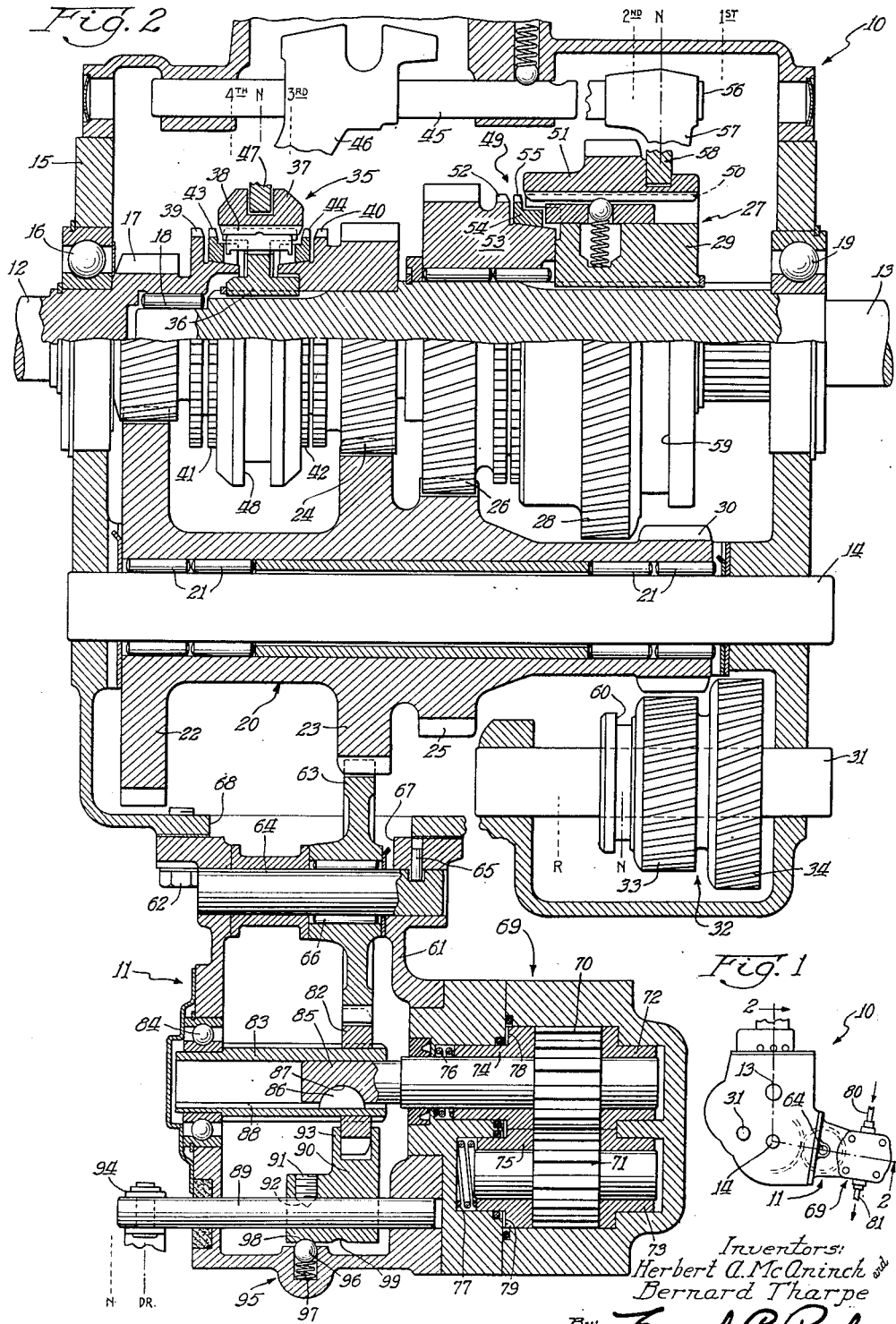
Inventors:
Herbert A. McAninch and
Bernard Tharpe
By Frank C. Parker
Atty

United States Patent Office 2,697,355
Patented Dec. 21, 1954

2,697,355

POWER TAKE-OFF ASSEMBLY

Herbert A. McAninch, Auburn, and Bernard Tharpe, Garrett, Ind., assignors to Borg-Warner Corporation, Chicago, Ill., a corporation of Illinois Application December 12, 1951, Serial No. 261,176

7 Claims. (Cl. 74—15.86)

This invention relates to power take-off mechanisms and more particularly to an improved device for taking power from a transmission gear for auxiliary uses.

According to this invention, a power take-off casing is secured to the casing of a multi-speed countershaft type transmission. A drive gear in the power take-off casing is constantly in mesh with one gear of the transmission countershaft which rotates at a fixed ratio with respect to the transmission drive shaft so that ratio changing in the transmission will not effect the power take-off drive. A shiftable power take-off gear is adapted for meshing with the drive gear for driving the power take-off means comprising a pressure loaded gear pump. The drive connection between the take-off gear and the pressure loaded gear pump is adapted for allowing axial movement of the gear pump drive shaft in order not to interfere with the pressure loading action of the pump. Means are provided for shifting the take-off gear into and out of engagement with the drive gear.

It is an object of the present invention to provide an improved and simplified power take-off mechanism.

Another object of the invention is to provide an improved power take-off mechanism for taking power from a transmission gear.

An additional object of the invention is to provide a simplified power take-off mechanism driven by a transmission gear in such a manner that ratio changing in the transmission will not effect the drive to the power take-off mechanism.

A further object of the invention is to provide an improved power take-off device in which a power take-off gear is adapted for driving power take-off means and is shiftably disposed for allowing selective operation of the power take-off means.

Still another object of the present invention is to provide a power take-off arrangement wherein a driving gear train is provided through a transmission gear, a power take-off drive gear in mesh with the transmission gear and a shiftable power take-off gear which is adapted for selectively meshing with the drive gear to drive power take-off means.

A still further object of the present invention is to provide an improved power take-off device including a pressure loaded gear pump with the drive connections to the gear pump allowing for axial movement of the gear pump drive shaft in order not to interfere with the pressure loading feature of the pump.

A specific object of the invention is to provide a power take-off mechanism comprising a pressure loaded gear pump driven through one countershaft gear of a multi-speed countershaft transmission independent of ratio changing in the transmission with a disengageable drive means being provided for the gear pump and constructed so that the pressure loading feature of the pump will not be interfered with.

Other objects, features and advantages of the present invention will be apparent from the following detailed description of one embodiment, by way of preferred example only, taken in conjunction with the accompanying drawings, in which:

Fig. 1 is an end elevational view of a transmission including a power take-off installation according to the present invention; and Fig. 2 is an enlarged sectional view taken along line 1—1 of Fig. 1, with some parts shown in elevation.

As shown in the figures, a multi-speed transmission generally designated by the reference numeral 10 has an auxiliary power take-off mechanism 11 operatively associated therewith in a manner to be described.

The transmission 10 includes a drive shaft 12, a driven shaft 13 and a countershaft 14. Power is supplied to the drive shaft 12 through an internal combustion engine or the like (not shown) preferably in conjunction with a friction clutch (not shown). The drive shaft 12 is rotatably secured in a transmission casing 15 by means of an anti-friction bearing 16, and a drive gear 17 is fixedly secured at the rearward end of the drive shaft as by being formed integrally thereon. The driven shaft 13 has its forward end portion piloted in the rearward end of the drive shaft 12 by means of anti-friction bearings 18, and the driven shaft is rotatably secured to the rearward end of the transmission casing 15 by means of anti-friction bearings 19.

The countershaft 14 has its end portions secured in the casing 15, and a countershaft gear cluster 20 is journalled about the shaft 14 by means of anti-friction bearings 21. A gear 22 is integrally formed at the forward end of the countershaft gear cluster 20 and is constantly in mesh with the drive gear 17 so that the countershaft gear cluster 20 is constantly driven by the drive shaft 12 at a fixed ratio thereto. A gear 23 of the countershaft gear cluster 20 is constantly in mesh with a gear 24 which is rotatably disposed on the driven shaft 13. A gear 25 of the countershaft gear cluster 20 is constantly in mesh with a gear 26 rotatably disposed on the driven shaft 13.

A shift mechanism 27 includes a gear 28 slidably splined about a shift block 29 which, in turn, is splined on the shaft 13. The gear 28 is adapted for shifting rearwardly in order to mesh with a substantially smaller gear 30 formed on the rearward end of the countershaft gear cluster 20.

An idler shaft 31 has its end portions rotatably secured in the casing 15 and has an idler gear cluster 32 slidably keyed thereon. The idler gear cluster 32 includes a gear 33 adapted for meshing with the gear 28 and a larger gear 34 adapted for contemporaneously meshing with the countershaft gear 30.

A two-position positive clutch assembly 35 is provided for selectively connecting the drive shaft 12 to the driven shaft 13 or the gear 24 to the driven shaft 13. The clutch 35 includes an annular member 36 splined to the driven shaft 13 and a clutch ring 37 slidably splined about the member 36 by means of internal teeth 38. The teeth 38 are adapted for engaging external teeth 39 formed integrally on the drive shaft 12 when the ring 37 is moved in a forward direction to connect the drive shaft 12 to the driven shaft 13. The teeth 38 are also adapted for engaging external teeth 40 formed on an integral hub portion of the gear 24 when the ring 37 is moved in the rearward direction for locking the gear 24 to the driven shaft 13. Synchronizer rings 41 and 42 are provided with external blocker teeth 43 and 44, respectively, which are interposed between the external teeth 39 and 40 and the internal teeth 38 when the ring 37 is in a neutral position as shown. The synchronizer rings 41 and 42 act in a well known manner to block the teeth 38 from engagement with the teeth 39 or 40 until the rotational speed of the ring 37 is synchronized with that of the driven shaft 12 or the gear 24 to prevent gear clash.

In order to provide for shifting of the ring 37 in either direction a shift rail 45 is slidably disposed in the casing 15 and is provided with a shift arm 46 having a shift fork 47 rotatably disposed in an annular external groove 48 formed in the ring 37. Control means (not shown) are provided for shifting the rail 45 in order to move the ring 37 forwardly or rearwardly to engage the teeth 39 or 40.

The shift mechanism 27 includes a positive clutch 49 provided for selectively connecting the gear 26 with the driven shaft 13. The clutch 49 includes integral internal teeth 50 formed in a hub portion 51 of the gear 28 and integral external teeth 52 formed on a hub portion 53 of the gear 26. A synchronizer ring 54 is provided with integral blocker teeth 55 disposed between the teeth 50 and the teeth 52 when the gear 28 is in a neutral position as shown. The synchronizer ring 54 operates in a well known manner to block the teeth 50 from engagement with the teeth 52 until the gear 28 and the gear 26 rotate at synchronized speeds.

Shift control means are provided for shifting the gear 28 in a forward direction to engage the positive clutch 49 and in a rearward direction to mesh the gear 28 with the gear 30. The control means may include a shift rail 56 slidably disposed in the casing 15 and having a shift arm 57 secured thereto, with a shift fork portion 58 rotatably disposed in an annular groove 59 formed externally in a portion of the gear hub 51. Means (not shown) are provided for shifting the rail 56 in order to engage the clutch 49 or to mesh the gears 28 and 30.

Shift control means may be provided for sliding the idler gear cluster 32 forwardly to engage the gear 28 with the gear 33 and the gear 30 with the gear 34. Such means are not shown but may include a shift fork engageable in an annular groove 60 formed in a hub portion of the gear cluster 32.

A low speed forward or first gear ratio may be provided through the transmission by engaging the gear 28 with the countershaft gear 30. In this ratio the drive is from the driven shaft 12 through the engaged gears 17 and 22, the countershaft gear cluster 20, the engaged gears 30 and 28 and the shift mechanism 27 to the driven shaft 13. It will be readily apparent that the first speed drive will be at a substantially reduced ratio since the gear 17 is smaller than the gear 22 and the gear 30 is substantially smaller than the gear 28.

A second speed forward drive ratio may be completed through the transmission by engagement of the positive clutch 49. The drive in this ratio is from the drive shaft 12 through the engaged gears 17 and 22, the countershaft gear cluster 20 and the engaged gears 25 and 26 to the driven shaft 13. It will be readily apparent that the drive in this ratio is still a reduced drive but not as much so as that in first speed ratio since the gear 25 is larger than the gear 30 and gear 26 is smaller than the gear 28.

A third speed forward drive ratio may be completed through the transmission by shifting the shift ring 37 rearwardly to engage the teeth 38 and the teeth 40. The drive in this ratio is from the drive shaft 12 through the engaged gears 17 and 22, the countershaft gear cluster 20, the engaged gears 23 and 24, the engaged teeth 38 and 40 and the clutch 35 to the driven shaft 13. The drive in this ratio still provides a reduction in speed of the driven shaft 13 but the reduction is not as great as that in second speed ratio since the gear 23 is larger than the gear 25 and the gear 24 is smaller than the gear 26.

A fourth speed forward drive or direct drive is provided by movement of the ring 37 in the forward direction to engage the teeth 38 with the teeth 39. In this ratio the drive is from the drive shaft 12 directly to the driven shaft 13 through the engaged teeth 38 and 39 and the positive clutch 35.

A reverse drive ratio may be completed through the transmission by shifting the idler gear cluster 32 forwardly until the gear 23 meshes with the gear 33 and the gear 30 meshes with the gear 34. The drive in this ratio is from the drive shaft 12 through the engaged gears 17 and 18, the countershaft gear cluster 20, the engaged gears 30 and 34, the idler gear cluster 32, the engaged gears 28 and 33 and the shift mechanism 27 to the driven shaft 13. It will be seen that the drive in this ratio will provide reverse rotation of the driven shaft 13 because of the interposing of the idler gear cluster 32 between the gear 30 and the gear 28. It will also be apparent that the drive in reverse will be at a reduced speed relative to the drive in first speed since the gear 33 is smaller than the gear 34.

According to this invention, the power take-off mechanism 11 includes a casing 61 which is fixedly secured to the transmission casing 15 by means of bolts 62. A power take-off drive gear 63 is rotatably disposed in the casing 61 on a shaft 64 which is non-rotatably secured in the casing 61 by means of a dowel pin 65. Anti-friction bearings 66 are disposed between the hub of the power take-off drive gear 63 and the shaft 64. Part of the peripheral portion of the drive gear 63 extends out of an aperture 67 in the power take-off casing 61 and into an aperture 68 in the transmission casing 15 and is in constant mesh with the countershaft gear 23.

Power take-off means are disposed in the power take-off casing 61. Herein such means comprise a pressure loaded gear pump 69 including meshing pump gear 70 and 71, respective end bushings 72 and 73 and respective thrust bushings 74 and 75. Respective compression springs 76 and 77 urge the bushings 74 and 75 toward the bushings 72 and 73 to exert a clamping, sealing pressure about the gears 70 and 71. Bleed means are provided (not shown) for bleeding fluid pressure from the pump outlet side to generally annular pressure loading chambers 78 and 79 in a well known manner such as that shown in Roth et al., U. S. Patent No. 2,420,622. Thus, the sealing force exerted by the thrust bushings 74 and 75 will vary directly as the outlet pressure of the pump in the manner described in said patent.

The gear pump 69 is adapted to draw fluid such as hydraulic or lubricating oil from a sump (not shown) to an inlet conduit 80 and to deliver pressurized fluid through an outlet conduit 81 to any fluid pressure operated means such as the hydraulic actuating cylinders (not shown) of a tractor or the like for moving a scraper blade, dumping a power operated shovel, etc.

Drive means are provided for positively driving the pump 69 from the power take-off drive gear 63. In the present instance such means comprise a power take-off gear 82 slidably splined on a sleeve shaft 83 and adapted for meshing with the drive gear 63. The sleeve shaft 83 is rotatably mounted in the casing 61 at one end portion by means of an anti-friction bearing 84. The opposite end portion of the sleeve shaft 83 is disposed about an extended pump drive shaft 85 which is formed as an integral extension of the hub of the pump gear 70. The pump drive shaft 85 is slidably keyed within the sleeve shaft 83 by means of a key 86 disposed in a cavity 87 in the shaft 85 with the distal end portion of the key 86 slidably disposed in an internal keyway 88 formed within the sleeve shaft 83.

The particular keyed connection between the drive shaft 85 and the sleeve shaft 83 is provided in order to achieve a simple, inexpensive, slidable, non-rotatable connection between the shafts. Such a connection is important when utilizing a pressure loaded gear pump in order that slight axial movement of the pump gear 70 be allowed in order not to interfere with the pressure loading, sealing feature of the pump.

Clutch means are provided for selectively connecting and disconnecting the power train between the transmission drive shaft 12 and the pressure loaded gear pump 69. To this end, a shift rail 89 is slidably disposed in the power take-off casing 61 and has a shift arm 90 fixedly secured thereto by means of a set screw 91 threadily inserted in the arm member 90 and engaging in an aperture 92 in the shift rail 89. The arm member 90 includes a shift fork portion 93 which slidably engages a peripheral portion of gear 82 at both sides thereof. To provide for shifting of the rail 89 suitable control means (not shown) may be secured to the rail through a bracket 94 fixed to the rail outside the casing 61.

In order to provide for positive drive and neutral positions for the rail 89 yieldable detent means 95 are provided in the form of a spherical member 96 urged by a compression spring 97 into engagement in one of two spherical cavities 98 and 99 formed in the member 90. As will be seen, when the spherical member 96 is engaged in the spherical cavity 98, the arm member 90 through the fork portion 93 holds the power take-off gear 82 in mesh with the drive gear 63 so that a power gear train is completed between the transmission drive shaft 12 and the pump 69. When the shift rail is moved forwardly so that the spherical member 96 engages in the spherical cavity 99, the gear 82 is disengaged from the drive gear 63 and the power take-off mechanism is in neutral position.

It will be noted that when the shift rail 89 is in the drive position, as shown in Fig. 2, the pressure loaded gear pump 69 will be driven at a constant speed ratio with respect to the transmission drive shaft 12 through the meshed gears 17 and 22, the countershaft gear cluster 20, the meshed gears 23 and 63, the meshed gears 63 and 82, the sleeve shaft 83 and the key 86 to the pump drive shaft 85. The drive ratio between the transmission drive shaft 12 and the pump 69 is not effected by shifting of gears or actuation of positive clutches in the multi-speed transmission 10.

From the foregoing description it will be readily apparent that the present invention provides an improved and simplified power take-off mechanism for taking power from a multi-speed transmission. The drive ratio between the transmission drive shaft and the power take-off means is not effected by ratio changes in the transmission. The take-off power is delivered to a pressure loaded gear pump to a simplified slidable, non-rotatable connection with a power take-off gear so that the pressure loading feature of the pump is not adversely effected.

It will be understood that modifications and variations may be effected without departing from the scope of the novel concepts of the present invention.

I claim:

1. In mechanism for taking power from a driven gear in a transmission, a power take-off casing fixed with respect to said transmission, a pump in said casing having a drive shaft and adapted when driven to provide take-off power in the form of pressurized fluid flow, a drive gear rotatably mounted in said casing and in constant mesh with said transmission driven gear, a power take-off gear rotatably mounted in said casing, means drivingly connecting said take-off gear to said pump including a shaft non-rotatably and axially shiftably connected to said pump drive shaft, and clutch means for selectively completing and disconnecting a drive connection between said transmission gear and said power take-off gear.

2. In mechanism for taking power from a transmission, a power take-off casing fixed with respect to said transmission, a pump in said casing and adapted when driven to provide take-off power in the form of pressurized fluid flow, said pump including an extended drive shaft portion, a sleeve shaft rotatably mounted in said casing and having a portion disposed about and axially shiftably keyed to said drive shaft portion, a power take-off gear slidably splined on said sleeve shaft, gear means driven by said transmission and adapted for meshing with said power take-off gear for driving the same to drive said pump, and means for shifting said take-off gear between a drive position in mesh with said gear means and a neutral position free of said gear means.

3. In mechanism for taking power from a transmission, a power take-off casing fixed with respect to said transmission, a pump in said casing and adapted when driven to provide take-off power in the form of pressurized fluid flow, said pump including an extended drive shaft portion, a sleeve shaft rotatably mounted in said casing and having a portion disposed about and axially shiftably keyed to said drive shaft portion, a power take-off gear slidably splined on said sleeve shaft, gear means driven by said transmission and adapted for meshing with said power take-off gear for driving the same to drive said pump, a shift rail having a portion slidably disposed in said casing, a shift fork secured to said rail and having a fork portion slidably engaging the opposite sides of said take-off gear, means for sliding said rail axially for shifting said take-off gear between a drive position in mesh with said gear means and a neutral position free of said gear means, and a spring pressed detent for yieldably holding said shift rail in said drive position and said neutral position, respectively.

4. In mechanism for taking power from a transmission adapted to provide a plurality of different drive ratios between a drive shaft and a driven shaft and including a transmission gear driven at a constant ratio with respect to said drive shaft, a power take-off casing fixed with respect to said transmission, a pressure loaded gear pump in said casing and adapted when driven to provide take-off power in the form of pressurized fluid flow, said pump including an extended drive shaft portion, a sleeve shaft rotatably mounted in said casing and having a portion axially slidably disposed about and keyed to said drive shaft portion to accommodate axial movement of said drive shaft portion while coupling the sleeve shaft and the drive shaft portion for concurrent rotation, a power take-off gear non-rotatably disposed on said sleeve shaft, a drive gear rotatably mounted in said casing and adapted for meshing with said transmission gear and said take-off gear, and clutch means for selectively completing and disconnecting a drive connection between said transmission gear and said pump.

5. In mechanism for taking power from a transmission adapted to provide a plurality of different drive ratios between a drive shaft and a driven shaft and including a transmission gear driven at a constant ratio with respect to said drive shaft, a power take-off casing fixed with respect to said transmission, a pump in said casing and adapted when driven to provide take-off power in the form of pressurized fluid flow, said pump including an extended drive shaft portion, a sleeve shaft rotatably mounted in said casing and having a portion disposed about and axially shiftably keyed to said drive shaft portion, a power take-off gear slidably splined on said sleeve shaft, a drive gear rotatably mounted in said casing in constant mesh with said transmission gear and adapted for meshing with said take-off gear, and means for shifting said take-off gear between a drive position in mesh with said drive gear and a neutral position free of said drive gear.

6. In mechanism for taking power from a countershaft transmission adapted to provide a plurality of different drive ratios between a drive shaft and a driven shaft and including a countershaft gear cluster driven at a constant ratio with respect to said drive shaft, a power take-off casing fixed with respect to said transmission, a pump in said casing and adapted when driven to provide take-off power in the form of pressurized fluid flow, said pump including an extended drive shaft portion, a sleeve shaft rotatably mounted in said casing and having a portion disposed about and axially shiftably keyed to said drive shaft portion, a power take-off gear slidably splined on said sleeve shaft, a drive gear rotatably mounted in said casing and in constant mesh with one gear of said transmission countershaft gear cluster, and a shift member for shifting said take-off gear between a drive position in mesh with said drive gear and a neutral position free of said drive gear.

7. In mechanism for taking power from a countershaft transmission adapted to provide a plurality of different drive ratios between a drive shaft and a driven shaft and including a countershaft gear cluster driven at a constant ratio with respect to said drive shaft, a power take-off casing fixed with respect to said transmission, a pressure loaded gear pump in said casing and adapted when driven to provide take-off power in the form of pressurized fluid flow, said pump including an extended drive shaft portion, a sleeve shaft rotatably mounted in said casing and having a portion axially slidably disposed about and keyed to said drive shaft portion to accommodate axial movement of said drive shaft portion while coupling the sleeve shaft and the drive shaft portion for concurrent rotation, a power take-off gear slidably splined on said sleeve shaft, a drive gear rotatably mounted in said casing and in constant mesh with one gear of said transmission countershaft gear cluster, a shift rail having a portion slidably disposed in said casing, a shift fork secured to said rail and having a fork portion slidably engaging the opposite sides of said take-off gear, means for sliding said rail axially for shifting said take-off gear between a drive position in mesh with said gear means and a neutral position free of said gear means, and a spring pressed detent for yieldably holding said shift rail in said drive position and said neutral position, respectively.

References Cited in the file of this patent

UNITED STATES PATENTS

| Number | Name | Date |
| --- | --- | --- |
| 1,872,924 | Galanot | Aug. 23, 1932 |
| 2,094,421 | Wagner | Sept. 28, 1937 |
| 2,162,979 | Simpson | June 20, 1939 |
| 2,384,399 | Reynolds | Sept. 4, 1945 |
| 2,412,588 | Lauck | Dec. 17, 1946 |
| 2,640,336 | Myers | June 2, 1953 |

FOREIGN PATENTS

| Number | Country | Date |
| --- | --- | --- |
| 464,848 | Germany | Aug. 28, 1928 |